United States Patent [19]

Gammon

[11] Patent Number: 5,682,701
[45] Date of Patent: Nov. 4, 1997

[54] INFLATABLE HUNTING DECOY

[76] Inventor: Terry G. Gammon, 1548 N. Sunrise Dr., Bowling Green, Ky. 42101

[21] Appl. No.: 564,541

[22] Filed: Nov. 30, 1995

[51] Int. Cl.$^6$ .................................................. A01M 31/06
[52] U.S. Cl. ............................ 43/2; 40/538; 446/226
[58] Field of Search ........................... 43/1, 2; 40/538; 446/226

[56] References Cited

U.S. PATENT DOCUMENTS

| | | | |
|---|---|---|---|
| 2,698,496 | 1/1955 | Miller | 446/226 |
| 2,731,768 | 1/1956 | Harrowe | 446/226 |
| 2,748,256 | 5/1956 | Moran | 40/538 |
| 3,052,054 | 9/1962 | Littleton | 43/1 |
| 3,670,440 | 6/1972 | Yost | 40/538 |
| 4,837,958 | 6/1989 | Radovich | 40/538 |
| 5,340,350 | 8/1994 | Fink | 40/538 |

FOREIGN PATENT DOCUMENTS 2047568  1/1993  Canada ........................................ 43/2

*Primary Examiner*—Kurt Rowan

[57] ABSTRACT

An inflatable hunting decoy includes a plastic inflatable body form having a plurality of flaps secured on opposing sides thereof. A plurality of grommets are individually disposed within the plurality of flaps of the plastic inflatable body form. A plurality of straps extend through the plurality of grommets disposed within the plurality of flaps on opposing sides of the inflatable body form for securement thereof to a tree.

2 Claims, 3 Drawing Sheets

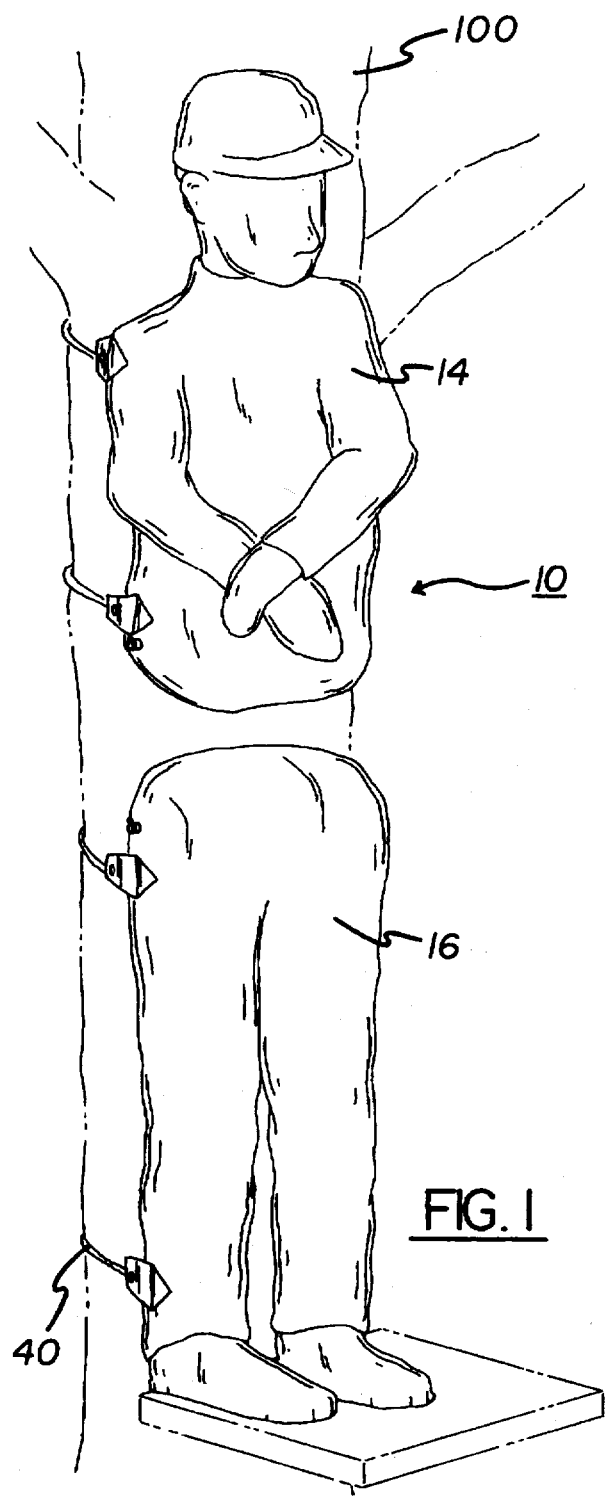
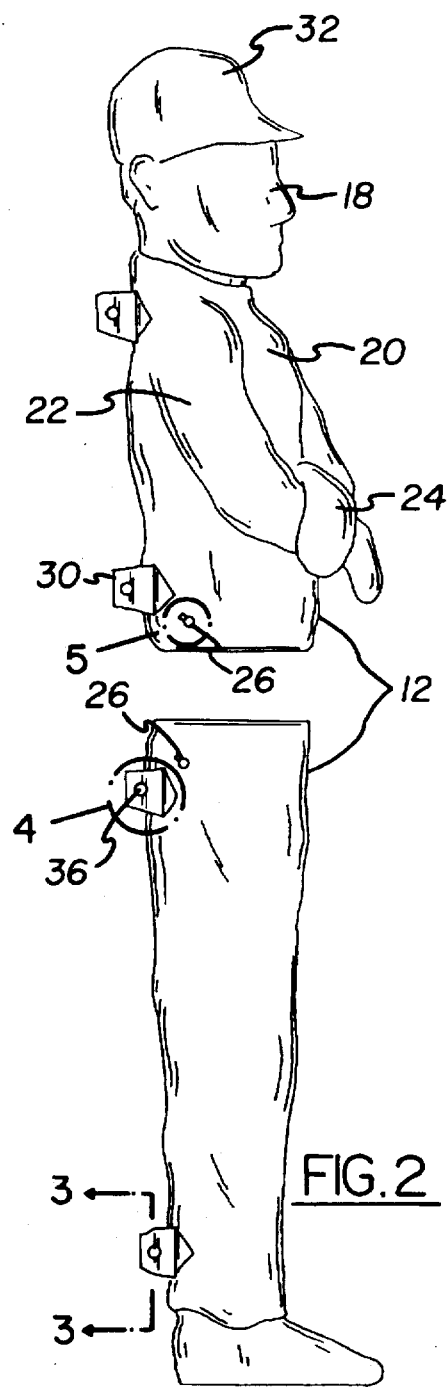

5,682,701

INFLATABLE HUNTING DECOY

BACKGROUND OF THE INVENTION

1. Field of the Invention

The present invention relates to an inflatable hunting decoy and more particularly pertains to resembling a human hunter for familiarizing game in a given area with a presence of a human with an inflatable hunting decoy.

2. Description of the Prior Art

The use of inflatable objects is known in the prior art. More specifically, inflatable objects heretofore devised and utilized for the purpose of simulating a human or animal are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,340,350 to Fink et al. discloses a multi-positional inflatable auto decoy.

U.S. Pat. No. 5,172,507 to Franceschini discloses a collapsible waterfowl decoy.

U.S. Pat. No. 4,895,546 to Rakonjac discloses an inflatable toy with independently movable limbs.

U.S. Pat. No. Des. 278,731 to Cohorst et al. discloses the ornamental design for an inflatable plush toy figures.

U.S. Pat. No. 4,268,030 to Richards discloses an inflatable action toy.

U.S. Pat. No. 3,460,283 to Stephens discloses an inflatable water-fowl decoy.

While these devices fulfill their respective, particular objective and requirements, the aforementioned patents do not describe an inflatable hunting decoy for resembling a human hunter for familiarizing game in a given area with a presence of a human.

In this respect, the inflatable hunting decoy according to the present invention substantially departs from the conventional concepts and designs of the prior art, and in doing so provides an apparatus primarily developed for the purpose of resembling a human hunter for familiarizing game in a given area with a presence of a human.

Therefore, it can be appreciated that there exists a continuing need for new and improved inflatable hunting decoy which can be used for resembling a human hunter for familiarizing game in a given area with a presence of a human. In this regard, the present invention substantially fulfills this need.

SUMMARY OF THE INVENTION

In the view of the foregoing disadvantages inherent in the known types of inflatable objects now present in the prior art, the present invention provides an improved inflatable hunting decoy. As such, the general purpose of the present invention, which will be described subsequently in greater detail, is to provide a new and improved inflatable hunting decoy and method which has all the advantages of the prior art and none of the disadvantages.

To attain this, the present invention essentially comprises a plastic inflatable body form comprised of an upper torso portion and a lower leg portion. The upper torso portion and the lower leg portion each have an inflation valve disposed in an opening extending therein. The upper torso portion and the lower leg portion each have a plurality of flaps secured on opposing sides thereof. A plurality of grommets are individually disposed within the plurality of flaps of the plastic inflatable body form. A plurality of straps extend through the plurality of grommets disposed within the plurality of flaps on opposing sides of the upper torso portion and the lower leg portion of the inflatable body form for securement thereof to a tree.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved inflatable hunting decoy which has all the advantages of the prior art inflatable objects and none of the disadvantages.

It is another object of the present invention to provide a new and improved inflatable hunting decoy which may be easily and efficiently manufactured and marketed.

It is a further object of the present invention to provide a new and improved inflatable hunting decoy which is of durable and reliable construction.

An even further object of the present invention is to provide a new and improved inflatable hunting decoy which is susceptible of a low cost of manufacture with regard to both materials and labor, and which accordingly is then susceptible of low prices of sale to the consuming public, thereby making such an inflatable hunting decoy economically available to the buying public.

Still yet another object of the present invention is to provide a new and improved inflatable hunting decoy which provides in the apparatuses and methods of the prior art some of the advantages thereof, while simultaneously overcoming some of the disadvantages normally associated therewith.

Even still another object of the present invention is to provide a new and improved inflatable hunting decoy for resembling a human hunter for familiarizing game in a given area with a presence of a human.

Lastly, it is an object of the present invention to provide a new and improved inflatable hunting decoy including a plastic inflatable body form having a plurality of flaps secured on opposing sides thereof. A plurality of grommets are individually disposed within the plurality of flaps of the plastic inflatable body form. A plurality of straps extend through the plurality of grommets disposed within the plurality of flaps on opposing sides of the inflatable body form for securement thereof to a tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the inflatable hunting decoy constructed in accordance with the principles of the present invention.

FIG. 2 is a side elevation view of the present invention.

The same reference numerals refer to the same parts through the various Figures.

DESCRIPTION OF THE PREFERRED EMBODIMENT

Figure 3:
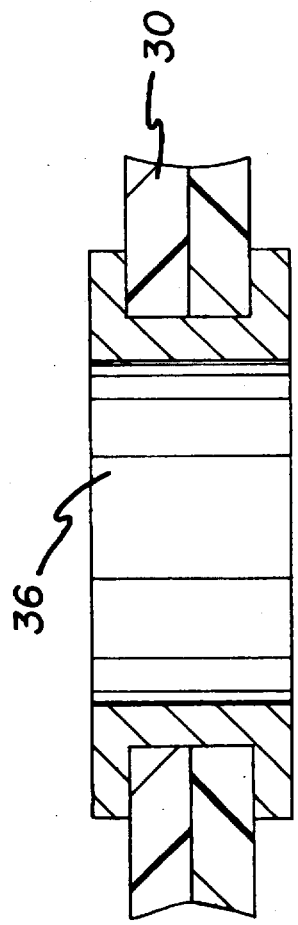
FIG. 3 is a cross-sectional view as taken along line 3—3 of FIG. 2.
Figure 4:
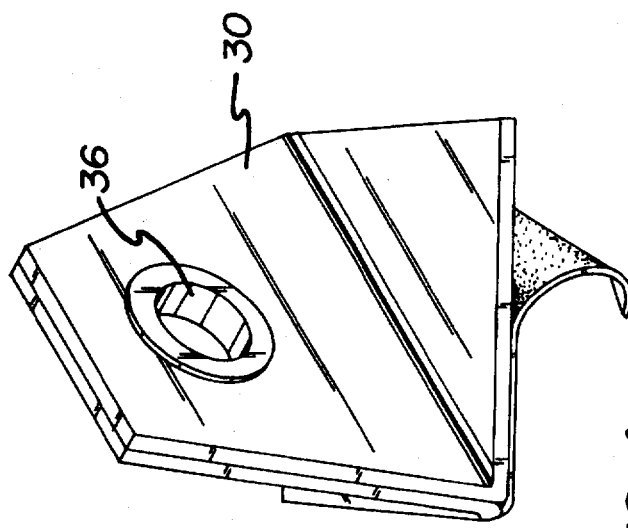
FIG. 4 is a perspective view of the flaps and grommets of the present invention.
Figure 5:
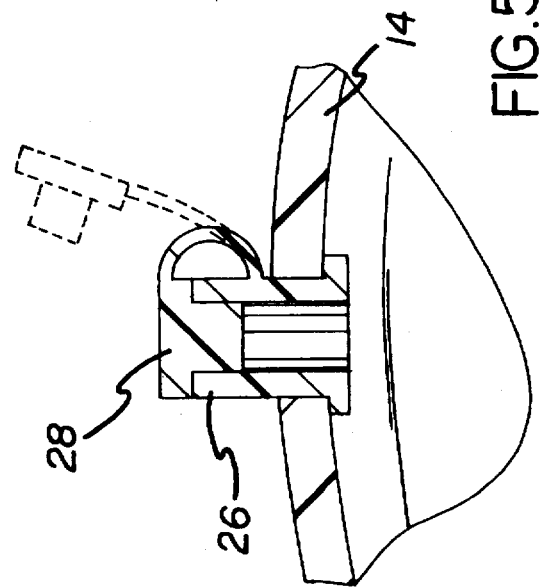
FIG. 5 is a side view of the inflation tube of the present invention.

With reference now to the drawings, and in particular, to FIGS. 1–5 thereof, the preferred embodiment of the new and improved inflatable hunting decoy embodying the principles and concepts of the present invention and generally designated by the reference number 10 will be described.

Specifically, it will be noted in the various Figures that the device relates to a new and improved inflatable hunting decoy for resembling a human hunter for familiarizing game in a given area with a presence of a human. In its broadest context, the device consists of a plastic inflatable body form, a plurality of grommets, and a plurality of straps. Such components are individually configured and correlated with respect to each other so as to attain the desired objective.

The device 10 includes a plastic inflatable body form 12 comprised of an upper torso portion 14 and a lower leg portion 16. The upper torso portion 14 includes a head 18, a torso 20, a pair of arms 22, and a pair of hands 24. The upper torso portion 14 and the lower leg portion 16 each have an inflation valve 26 disposed in an opening extending therein. The inflation valve 26 allows inflation or deflation of the inflatable body form 12. The inflation valve 26 includes a cap 28 adapted for removable securement within the valve 26 to preclude the unwanted deflation of the body form 12. The upper torso portion 14 and the lower leg portion 16 each have a plurality of flaps 30 secured on opposing sides thereof. In the preferred embodiment, the upper torso portion 14 has the pair of arms 22 shown in a crossing relationship across the torso 20 thereof. The head 18 of the upper torso portion 14 also contains a hat 32 thereon. The body form 12 is a human-looking decoy that is set up on a tree stand or hunting site prior to opening day of the hunting season, to cause deer to become used to someone being there. The body form 12 is constructed of lightweight, yet durable material, and is a replica of a man dressed in camouflage clothing.

Next within the device 10 is a plurality of grommets 36 individually disposed within the plurality of flaps 30 of the plastic inflatable body form 12. The plurality of grommets 36 are fabricated of a metal material providing reinforcement to the plurality of flaps 30.

A plurality of straps 40 extend through the plurality of grommets 36 disposed within the plurality of flaps 30 on opposing sides of the upper torso portion 14 and the lower leg portion 16 of the inflatable body form 12 for securement thereof to a tree 100. The straps 40 extend through the grommets 36 and wrap around the tree 100 to support the body form 12 in a standing or sitting position.

Figures 6, 7:
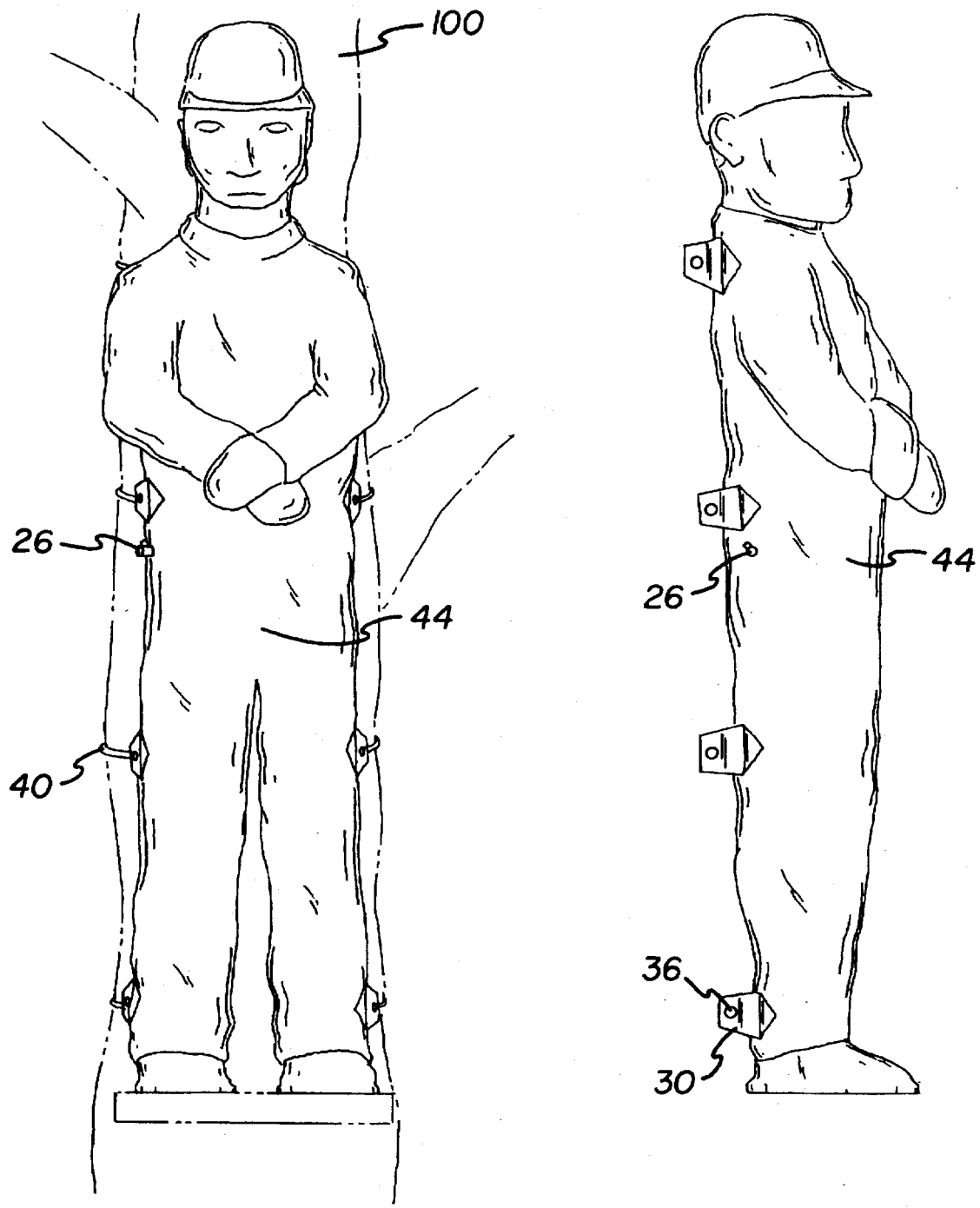
FIG. 6 is a front view of a second embodiment of the present invention.
FIG. 7 is a side elevation view of the second embodiment of the present invention.

A second embodiment of the present invention is shown in FIGS. 6 and 7 and includes substantially all of the components of the present invention wherein the inflatable body form 12 is constructed of one unitary portion 44. The device 10 can be produced in two separate sections, the upper torso portion 14 and the lower leg portion 16, which can be arranged to appear in either a sitting or standing position. The one unitary portion 44 would be utilized as a standing model.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An inflatable hunting decoy for resembling a human hunter for familiarizing game in a given area with a presence of a human comprising, in combination:

a plastic inflatable body form comprised of an upper torso portion and a lower leg portion, the upper torso portion and the lower leg portion each having an inflation valve disposed in an opening extending therein, the upper torso portion and the lower leg portion each having a plurality of flaps secured on opposing sides thereof;

a plurality of grommets individually disposed within the plurality of flaps of the plastic inflatable body form;

a plurality of straps extending through the plurality of grommets disposed within the plurality of flaps on opposing sides of the upper torso portion and the lower leg portion of the inflatable body form for securement thereof to a tree.

2. The hunting decoy as set forth in claim 1 wherein the inflatable body form having an outer surface with a camouflage pattern disposed thereon.

* * * * *